United States Patent [19]

Gautherin et al.

[11] Patent Number: 4,791,544

[45] Date of Patent: Dec. 13, 1988

[54] REGULATING CONTROL FOR SINGLE-ENDED SWITCHING POWER SUPPLY

[75] Inventors: George A. Gautherin, Woodside; Sol Greenberg, Roslyn, both of N.Y.

[73] Assignee: Veeco Instruments, Melville, N.Y.

[21] Appl. No.: 169,606

[22] Filed: Mar. 17, 1988

Related U.S. Application Data

[63] Continuation of Ser. No. 47,608, Apr. 28, 1987, abandoned, which is a continuation of Ser. No. 854,660, Apr. 18, 1986, abandoned, which is a continuation of Ser. No. 652,974, Sep. 21, 1984, abandoned.

[51] Int. Cl.$^4$ .......................................... H02M 3/335
[52] U.S. Cl. ...................................... 363/49; 363/21; 323/901; 323/908
[58] Field of Search ................. 363/20, 21, 49, 55–56, 363/97, 131; 323/901, 902, 908

[56] References Cited

U.S. PATENT DOCUMENTS

| | | | |
|---|---|---|---|
| 3,935,527 | 1/1976 | Michelet et al. | 363/49 |
| 4,326,245 | 4/1982 | Saleh | 363/21 X |
| 4,459,651 | 7/1984 | Fenter | 363/49 X |
| 4,504,898 | 3/1985 | Pilukaitis et al. | 363/49 |

Primary Examiner—Peter S. Wong
Attorney, Agent, or Firm—Morgan & Finnegan

[57] ABSTRACT

A regulating control circuit for a single-ended switching power supply includes means for controlling the switching duty cycle during start-up, normal operation and current limiting modes. Normal operation utilizes a duty cycle of less than about 50%, but low input voltage operation can occur for limited times at duty cycles up to 70%–80%. A time base generator defines the maximum permissible switch conduction time, as well as the switching rate. During start-up, input current is restricted to reduce dissipation within the control circuit, the start-up duty cycle also being maintained at a low value by extending the switch non-conduction time. In the current limiting mode, the duty cycle is reduced as a function of current demand to achieve constant current operation over a given range of output voltages, and to achieve current foldback below such range. In current foldback, the switch non-conduction period is extended to obtain unusually low duty cycles in near shorted output conditions.

32 Claims, 7 Drawing Sheets

CONVENTIONAL REGULATED SWITCHING POWER SUPPLY

REGULATING CONTROL FOR SINGLE-ENDED SWITCHING POWER SUPPLY

This is a continuation of co-pending application Ser. No. 07/047,608, filed on Apr. 28, 1987, now abandoned, which is a continuation of co-pending application Ser. No. 06/854,660, filed on 4/18/86, which in turn is a continuation of parent application Ser. No. 06/652,974, filed on 9/21/84, both abandoned.

BACKGROUND OF THE INVENTION

This invention related to improved control means for regulated switching power supplies, particularly power supplies of the single-ended type. Specifically, the invention relates to an efficient regulating control circuit providing several functions for both feed-forward line regulation, and output regulation under varying load conditions.

Switching power supplies are among the most widely used types of power supplies in the electronics industry. The are used extensively in digital computers and other data processing applications, electronic test systems, avionics equipment and, in general, throughout all branches of industry. Because of their universal application, and since often several regulated power supplies are required in a single electronic installation, cost is a critical factor of choice.

Of equal importance is the ability of the power supply to satisfy stringent technical requirements. With the increasing sophistication of electronic systems, together with the trend toward electronic miniaturization and extremely high electronic density, operating specifications have been made stricter. Obviously, a power supply must accurately control the regulated output parameters within specified limits. Additionally, it must have the capability of protecting itself against fluctuations in line voltage and inadvertent overloading by the user. Thus the power supply desirably should be able to protect itself against heavy current overloads, even short circuits, and should be able to withstand extended periods of brownout (i.e., low input power caused by reductions in line voltage) without damage.

With the high electronic density found in modern day digital computers, control of heat dissipation within the power supply itself is critical. In order to be compatible with environments of high electronic and power density, the power supply should have a small physical size and consume small amounts of power for control functions. If the power supply is small, it is essential to control the power that develops within the power supply during operation; otherwise, heat will accumulate within the power supply chassis. If such generated heat is not minimized, large heat sinking masses must be incorporated in order to transfer heat to points external to the chassis. Such heat sinking masses raise the cost of the power supply significantly and add to its weight and size.

As is well known in the art, switching power supplies incorporate controllable switch means which provide current pulses to an output circuit that converts the current pulses into a direct current output. Regulation of the output parameter, e.g., output voltage, is gained by controlling the duty cycle of switch operation. Control of the switched power duty cycle is obtained by continuously and automatically adjusting the duration of switch activation in accordance with incremental variations in the output voltage.

In a balanced type of regulated switching power supply, an inverter customarily is used to convert unregulated direct current (derived from the external source) into an alternating current signal. This a.c. signal controls alternately conducting switching transistors for transferring power to an output transformer having suitable filters to convert the switched power back to direct current power at the output. A disadvantage of the balanced type of power supply is its susceptibility to transformer saturation due to volt-time unbalances. The characteristics of the switched current must be carefully controlled in order to avoid high d.c. components in the output transformer. Perhaps its most significant disadvantage is cost. Because two power switching transistors and a larger center-tapped output transformer are required, the balanced power supply is more costly to manufacture than single-ended supplies using a single switching transistor and no center transformer tap.

In the single-ended type of switching power supply, output regulation is achieved in essentially the same way, i.e., the switched current duty cycle is controlled in order to maintain the output parameter (voltage and/or current) at the desired level. This output voltage is a function of the input line voltage, the tranformer winding turns ratio, and the duty cycle of the current switched to the output transformer. Nevertheless, here is a limit to which the duty cycle can be extended in order to compensate, for example, for excessively low input line voltages. This is because the volt-time products at the transformer primary must be equal for switch conduction and non-conduction periods.

For any given input voltage, the volt-time product increases with increasing switch conduction time. Thus, as switch conduction time increases, the voltage generated in the primary of the transformer during the non-conducting portion of the cycle will also increase. Theoretically, if the switch were allowed to conduct for nearly the entire switching cycle, the non-conduction period would become infinitesimally small and, accordingly, the voltage developed across the switch would become infinitely large. Indeed, this voltage would greatly exceed the limits of the switching transistor and it would quickly burn out.

It is thus necessary in single-ended switching power supplies, to carefully limit the duty cycle of the switching transistor to a maximum value selected to preclude the primary transformer voltage from exceeding the switch's breakdown tolerance. Many power-line driven single-ended power supplies are designed to limit this duty cycle to about 50% and, thus, the switch conducts for not more than about one-half of the available switching cycle. This limitation restricts the degree of attainable output regulation as a function of load or input line variations. Variations in output calling for a duty cycle greater than 50% will result in loss of regulation. In the present invention, the duty cycle may be extended to 70%-80%, thus permitting regulation over wider swings in load current and line voltage.

Another important requirement for regulated power supplies used in data processing applications is that a minimum "hold-up" time be achieved for power failure. Thus, the power supply normally must be able to maintain a minimum output voltage under full rated load for short periods of time sufficient to permit the computer memories to be switched to a back-up battery or auxiliary power. This requires a sufficiently large input filter capacitance to store the necessary energy after input power is lost. If regulation can be achieved, as in the present invention, over a broader range of input voltages, then a smaller capacitor can be used. On the other hand, if, under power "brownout" (i.e., very low line voltage) conditions, adequate control measures are not implemented, then the period of switch conduction can grow long enough to drive the output transformer into saturation with a resultant loss in output voltage. Moreover, since maximum heat dissipation in the switching transistor occurs during brownout, the switching device can exceed its thermal limitations and be destroyed. The present invention incorporates means to avoid these operational restrictions.

Over-current protection is another requirement for regulated power supplies. In order to protect the power supply against burn out, as well as to protect the user's equipment against damage due to abnormal current demands, as where there is an inadvertent short circuit, means must be provided to limit the power supply current output. The present invention incorporates current limiting in a manner unique to switching power supplies.

SUMMARY OF THE INVENTION

The present invention effects several improvements for controlling regulated single-ended switching power supplies. It incorporates feed-forward regulation in a manner to obtain tight conrol over modulation of the switch duty cycle, permitting an extended range of operation. As contrasted with typical commercial power supplies in which the duty cycle called for by the control circuit exceeds its maximum limit under certain transient conditions, the power supply described herein can operate successfully with duty cycles on the order of 70%-80%, and even as high as 90% without losing control. This is achieved by incorporating a stable time base reference having, under normal operating conditions, an established repetition frequency and a stable reference signal defining a maximum switch conduction time. Under most normal operating conditions the duty cycle will not exceed 50%. Under momentary unusual conditions, however, the duty cycle is permitted to increase, yet remain within the limitations of the control loop, so as to maintain regulation. The time base signal serves as the time reference and ensures that the maximum switch conduction time is not exceeded under any circumstances.

In the preferred embodiment, the time base is established by a time base pulse generator, and pulse width modulation is used to alter the duty cycle of switch activation as an inverse function of line voltage and excessive output current. To that end, a signal proportionate to line voltage is integrated with time and compared with a control signal representative of the output parameter, e.g., output voltage. A switch activation signal is produced once each cycle as long as the integrated signal is less than the control signal. Thus width modulation occurs as a result of either input voltage or output voltage change.

The system is designed such that the maximum period of switch conduction at full rated power output will ordinarily result in a duty cycle not exceeding about 50% time base. Importantly, the control loop maintains regulation under all operating conditions other than that of an input voltage insufficient to maintain the output at the desired regulated value. Under such abnormal input conditions as brownout or power failure, the time base signal serves an overriding function to inhibit switch conduction for periods that would cause the duty cycle to exceed, for example, 80%.

In addition to the foregoing features, the invention may incorporate a low-line voltage timer operative to preclude switch activation, and thereby shut down the power supply, if an under-voltage condition persists beyond a permissable limit. This, as earlier mentioned, serves to protect the switching device from thermal overload and possible voltage breakdown. In the preferred embodiment, the low-voltage timer includes, as part of the same circuit, means for reducing the switching frequency, thereby effectively reducing the duty cycle during start-up. This limits the current required by the control circuit and enables the power supply to be started with a small current drain, thus limiting start-up power dissipation within the control circuit.

The current limiting circuit according to the invention provides both constant current operation at rated current and current "foldback" under excessive load conditions. Specifically, the current limiter takes over at maximum rated output current to hold output current subtantially constant over a range of output voltages less than rated voltage. In this mode of operation, the power supply operates as a constant current source, permitting it to be connected in parallel with other power suplies to power loads in excess of the single power supply rating.

If the load conductance increases still further, the power supply enters a current "foldback" region, whereby both voltage and current are reduced. The current limiter will, if necessary, reduce the basic operating frequency to a lower value (thereby decreasing the duty cycle of switch conduction) in order to achieve current control under excessively high load conductance such as a short-circuit at the output terminals.

For a complete description of the invention, reference may be made to the following detailed description of the preferred embodiment, and to the accompanying drawings.

DESCRIPTION OF THE PREFERRED EMBODIMENT

Before considering the invention, it is helpful to understand the basic elements of a single-ended switching power supply. Such a coventional power supply is outlined in the block diagram of FIG. 1.

Figure 1:
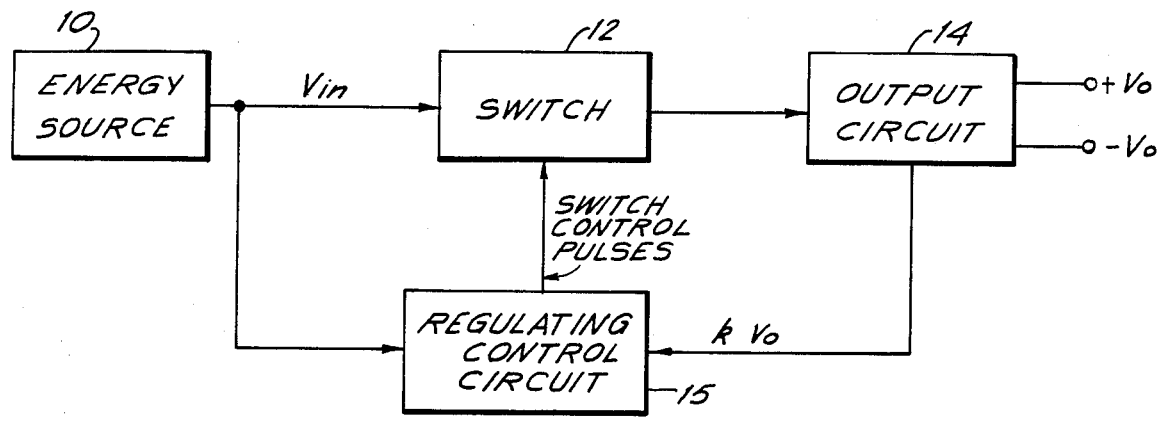
FIG. 1 is a block diagram showing the basic elements of a conventional regulated switching power supply of the single-ended type.

The power supply operates from an energy source 10, such as the normal AC line, which is rectified and filtered to produce an essentially direct current inptut voltage $V_{in}$, which normally appears across the input filter capacitor. Direct current from the intput is provided to a switch 12, usually a high-power rated switching transistor, which transfers the direct current from the source to a output circuit 14. Power is transferred as a series of discrete pulses of variable width, the duration of the pulses being determined by a regulating control circuit 15. As shown in FIG. 1, this circuit controls the operation of switch 12 by generating switch control, or switch-activating pulses. The present invention concerns the regulating control circuit 15.

In a switching power supply, the output parameter, e.g., output voltage, is determined by the expression $V_o = V_{in} (t_{on}/T_p) (N_s/N_p)$, where $V_{in}$ is the input voltage, $t_{on}$ is the switch conduction period, $T_p$ is the period of repetition at the switching rate and $N_s/N_p$ is the winding turns ratio of the transformer in the output circuit. Thus, the output voltage $V_o$ is a function of the duty cycle $t_{on}/T_p$ of the power transferred by the switch to the output circuit. Consequently, the output voltage $V_o$ can be regulated by controlling the switch conduction time $t_{on}$, by controlling the switching time period $T_p$, or both.

It is clear that output voltage also is a function of the input voltage $V_{in}$. Obviously, if the line voltage varies, so will $V_{in}$ and so will $V_o$. In the power supply depicted in FIG. 1, feed-forward regulation is employed. This means that the switch conduction time $t_{on}$ is controlled in accordance with variations in the input voltage $V_{in}$. If the line voltage falls, therefore, it is necessary to increase the switch conduction time $t_{on}$ in order to enlarge the duty cycle $(t_{on}/T_p)$ for maintaining the output voltage $V_o$ at the desired value. This is called "feed-forward" control and, theoretically, variations in line input voltage never reach the output.

Load regulation of the output voltage, is achieved by varying $t_{on}$ in accordance with variations in the output voltage. Specifically, an incremental change in output voltage results in a concomitant change in the duration $(t_{on})$ of switch activation. A downward change in $V_o$ as a result of increased current demand, for example, causes a lengthening of the period $t_{on}$. The control loop gain is usually very high such that extremely small changes in output voltage will support the required change in switch control pulse duration.

Operation Of The Regulating Control System

Figure 2:
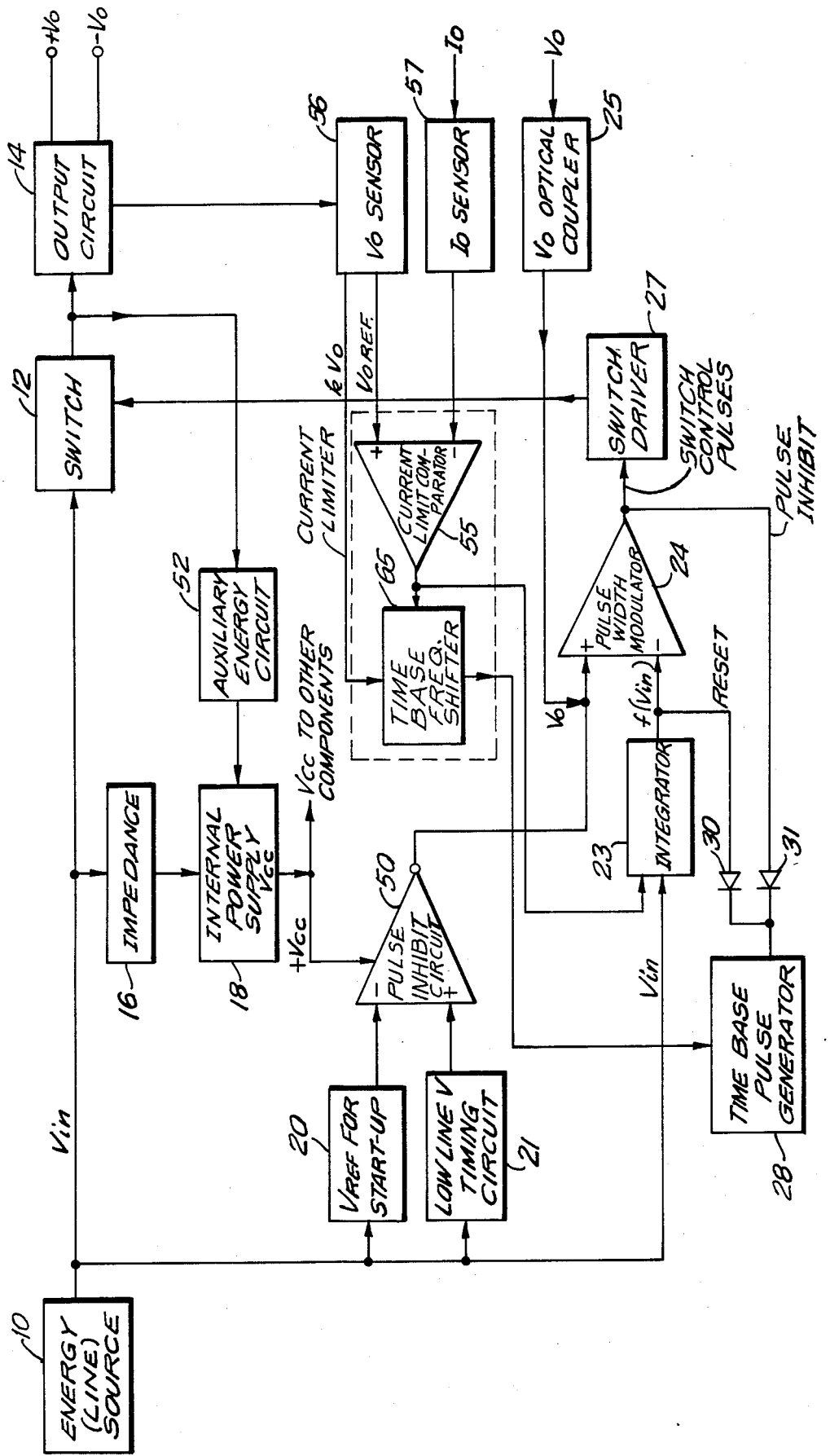
FIG. 2 is a block diagram of the preferred embodiment of a regulated switching power supply incorporating the invention.

Turning now to the regulating control circuit of the invention depicted in FIG. 2, the energy source 10, switch 12, and output circuit 14, which form no part of the invention per se, have been given identical reference numerals to those shown in FIG. 1. The remaining elements comprise, or interact with, the regulating control means.

As shown, the energy source develops an essentially direct current input $V_{in}$, which is the voltage across the filter capacitor of a conventional input rectifier circuit. However, the power supply will also operate from a direct current source; thus $V_{in}$ could also represent the actual source voltage. In either case, the d.c. input voltage is supplied to switch 12 such that, when the switch is activated, power is transferred to the output circuit. When the switch is not activated, power transfer terminates.

Input power at voltage $V_{in}$ also powers the regulating contool elements. To that end, input current is supplied through a current-restricting impedance 16 to internal power supply 18. Internal power supply 18 establishes the control circuit voltage $V_{cc}$. Illustratively, $V_{cc}$ may be on the order of 15 volts d.c.

Input voltage $V_{in}$ also acts as a signal input to voltage reference circuit 20, to low line voltage timing circuit 21 and to electronic integrator circuit 23. Integrator 23 provides, at its output, a signal varying generally linearly with time as a rate function of $V_{in}$. This integrated signal, because it is a measure of input voltage variations, constitutes the feed-forward input for regulating power transfer as a function of changes in line voltage. This feed-forward signal is supplied to pulse width modulator 24, which receives, as a second input, a signal derived from optical coupler 25 and representative of the output voltage $V_o$.

The output of pulse width modulator 24 is a switch control pulse whose duration is determined by both the line input voltage and the output voltage to be regulated. The duration of this switch control pulse is inversely related to the magnitude of the input voltage, and is also inversely related to incremental changes in the output voltage. The switch activating pulse at the output of modulator 24 is supplied to switch driver circuit 27, which turns on switch 12 at the beginning of each switch control pulse, and turns off switch 12 at the end of this switch control pulse.

In accordance with the invention, generator 28 provides a time base signal defining the switching period as well as the maximum duty cycle of power transfer. The time base signal is in the form of a pulse train having a defined period $T_p$ and a stable maximum pulse duration $t_{max}$. The time base signal allows for a fixed maximum permissible duty cycle substantially exceeding 50% and, preferably, at least 70%. It also provides a time reference point for each switch control pulse, and inhibits the outuut of pulse width modulator 24 at $t_{max}$ such that in no event will switch 12 be activated beyond the maximum permissible time period $t_{max}$ during any single switching cycle.

At the start of each time base pulse, the output of generator 28 becomes essentially an open circuit whereby diodes 30, 31 are non-conducting. Under this condition, the output of integrator 23 is applied to the negative input of pulse width modulator 24. As long as the signal at the integrator output is less than the $V_o$ signal at the modulator's positive input during normal operation, the output of the modulator 24 is high, and switch driver 27 activates the switch. The $V_o$ signal constitutes the control input level for the modulator; when the integrated $V_{in}$ signal attains the same level as the $V_o$ control signal, the output of modulator 24 goes low to terminate the switch control pulse and deactivate switch 12.

It can thus be seen that the integrated signal, which is a function of $V_{in}$, will attain the level (e.g., 36 or 38 in FIG. 3) of the control signal relatively quickly for high line voltages, and will attain this level relatively slowly for low line voltages. Accordingly, the duration of switch activation will be shorter at high line voltages, and longer at low line voltages. For a constant output voltage, this means that the volt-time product will remain constant. However, should the input voltage fall to an excessively low level, calling for switch activation for a period longer than $t_{max}$, the time base signal inhibits the output of pulse width modulator 24 at $t_{max}$.

Regulation as a function of output voltage $V_o$ is achieved in a similar manner. If $V_o$ tends to diminish as a result of a high load condition, the $V_o$ signal to modulator 24 increases. This results in pulses at the output of modulator 24 of relatively longer duration. On the other hand, if $V_o$ tends to rise, as would be the case under light load conditions, the control level set by the $V_o$ input to modulator 24 decreases, resulting in switch control pulses of relatively short duration.

In the present invention the range of variation in the $V_o$ and integrated $V_{in}$ signals is restricted, so that the duration of the switch activating pulses at the output of modulator 24 never reaches $t_{max}$ under rated parameters for continuous operation. Normally, the duty cycle of switch 12 is only 50% or less; longer duty cycles occur momentarily and only during abnormally low line conditions.

Figure 3A:
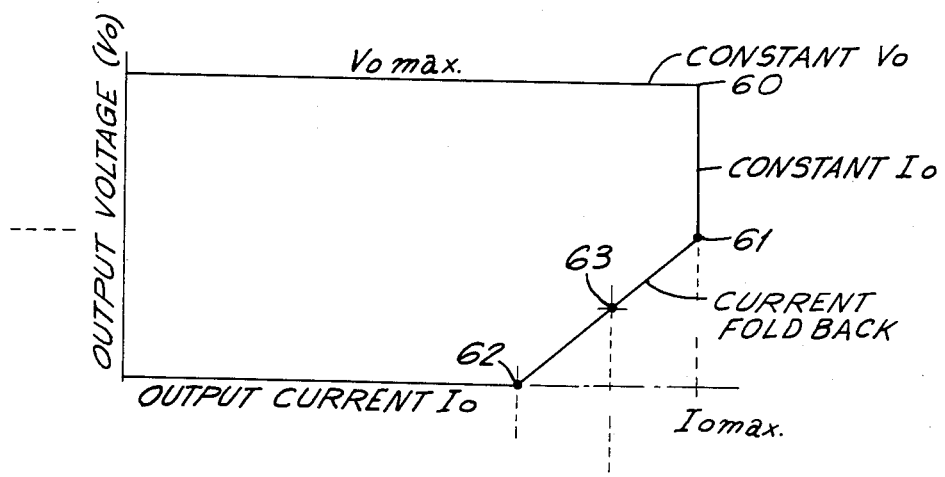
FIG. 3A is a graph showing the relationship between output current and output voltage achieved with the invention.
Figure 3:
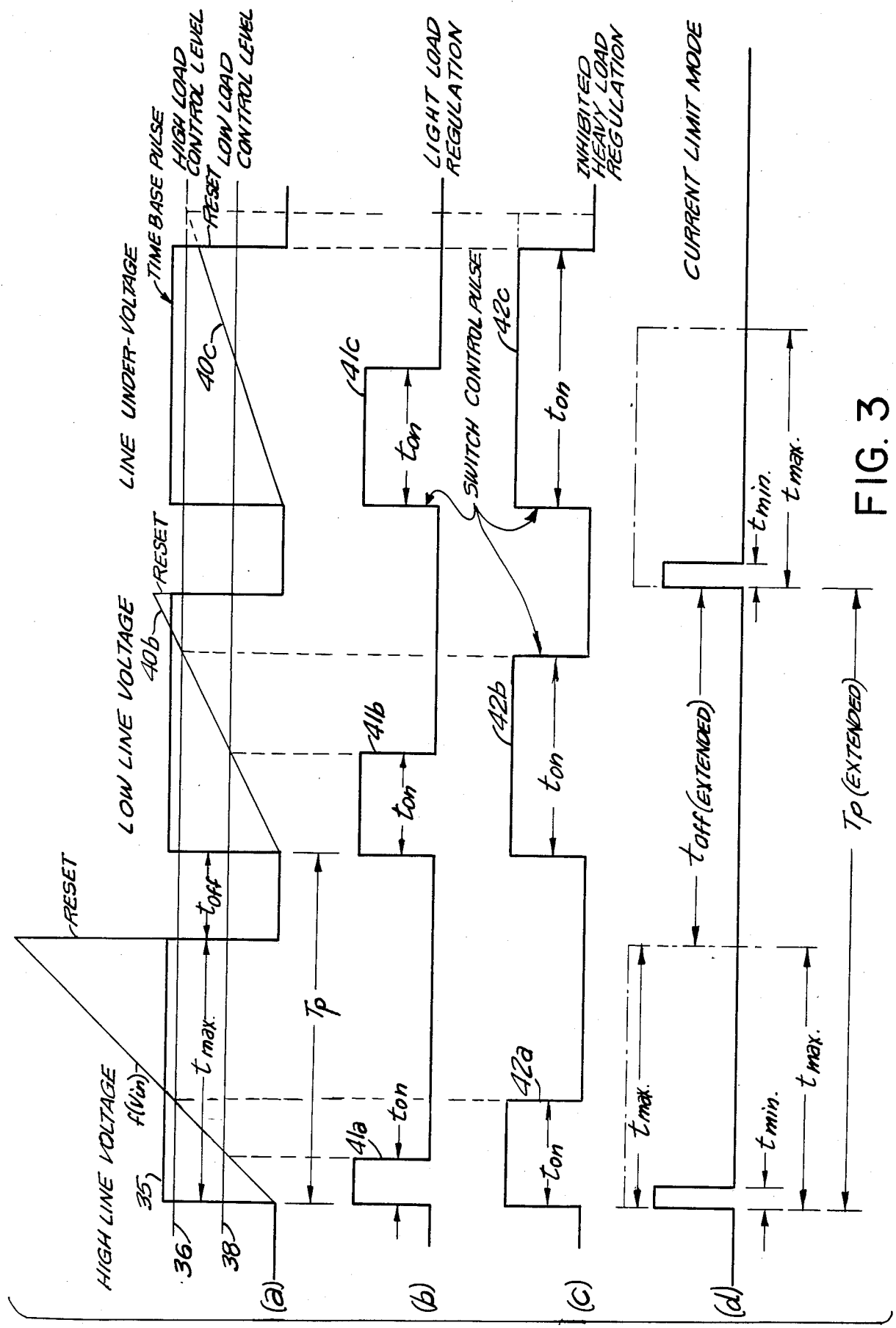
FIG. 3 is a series of waveform graphs helpful in understanding the operation of the invention.

FIG. 3 depicts the various regulating situations described above. In graph (a) the time base signal 35 is seen to have a period $T_p$ constituted of a maximum pulse width $t_{max}$ and an off period $t_{off}$. The ratio $t_{max}/T_p$ defines the maximum duty cycle for switch activation. The signal level 36 represents an illustrative maximum control level determined by the $V_o$ input to modulator 24 under heavy load conditions. The signal level 38 represents an illustrative control level for a light load condition. Triangular waveforms 40a-40c represent the integrated $V_{in}$ signal produced by integrator 23. Waveform 40a is typical for high line voltages; waveform 40b is typical for low line voltages and waveform 40c is representative of an excessively low line voltage condition.

FIG. 3, graph (b), shows the resulting switch control pulses (and the switch activation times) for each of the conditions shown in graph (a). As can be seen, as line voltage decreases, the switch control pulse width increases at any given load condition. Similarly, under heavy load (low $V_o$) conditions, the switch control pulse width is greater than under light load conditions. As shown, if the switch control pulse 42c were permitted to attain a duration determined solely by the $V_o$ and integrated $V_{in}$ signals, it would exceed the period $t_{max}$. However, pulse 42c would be inhibited by the time base signal, and thereby terminated, at the end of period $t_{max}$. This ensures that the voltage across the output transformer primary during the period $t_{off}$ will be limited to a safe value. As earlier noted, the input signals to modulator 24 are selected so that within all conditions of operation except excessively low input voltage, the switch control pulses never attain the $t_{max}$ width.

Returning to FIG. 2, the regulating control means of the invention incorporates several features for protecting the power supply under abnormal operating conditions. As noted above, the invention incorporates a current limiting impedance 16 which restricts the current drawn by the control circuit elements to an unusually low value, e.g., 5 milliamps. The current requirement to start operation of the control circuit is the sum of the charging currents of the circuit capacitors, plus the operating current of the control semiconductors, plus the drive current required for activation of the power switching transistor. By restricting the starting current to low value, the start-up power dissipation is minimized.

Under start-up and certain low-line voltage conditions, pulse inhibit circuit 50 inhibits the switch control pulse. Circuit 50 operates to maintain a low, essentially shorted, condition at the positive input to pulse width modulator 24 until the voltage $V_{cc}$ builds up to a reference voltage established at unit 20 and connected to the negative input. This precludes the production of a switch control pulse by modulator 24, irrespective of the state of time base generator 26. As soon as $V_{cc}$ achieves this reference voltage, the output of pulse inhibit circuit 50 goes high, thus permitting modulator 24 to gain normal control.

When the switch is activated, an auxiliary energy circuit 52 transfers a portion of the switched energy back to the internal power supply 18 to recharge this component incrementally upon each switch activation. Although time base generator 28 continues to operate, the effect of the pulse inhibit circuit 50 is to extend the period between successive switch control pulses and thereby keep the duty cycle at low value during start-up. Since the switch activation duty cycle is low, so too is the start-up current requirement.

A second function provided by circuit 50, in conjunction with the low line voltage timer circuit 21, is to effectively shut down the power supply by precluding switch activation if $V_{in}$ drops below a predetermined value for a predetermined length of time. To that end, circuit 21 feeds the positive input of circuit 50 with a signal representative of $V_{in}$. When the $V_{in}$ signal falls below the $V_{ref}$ signal provided by circuit 20, the output of circuit 50 goes low, thus inhibiting the production of switch activation pulses as long as $V_{in}$ remains below the predetermined value.

The regulating control means also has a unique current limiting feature. As shown in FIG. 2, a current limit comparator 55 receives inputs from a $V_o$ sensor 56 and an output current sensor 57. The output of comparator 55 is used to inject current into integrator 23, thus causing the ramp function $f(V_{in})$ (see graph (a) of FIG. 3) to rapidly attain the control level and, thus, terminate activation. The current limit circuit becomes operative when the load conditions call for an output current in excess of the rated current $I_{o\,max}$ of the power supply.

Referring to FIG. 3A, the power supply operates at full rated output voltage $V_{o\,max}$ for all currents up to the maximum rated current. Current limiting begins at point 60. Thereafter output current is held constant at $I_{o\,max}$ over a range of output voltages between points 60 and 61, the latter point being about 30%–50% of $V_{o\,max}$. At point 61, the power supply begins to operate in the current foldback region. Because of the special features incorporated by the invention, this region extends to a point where the output is at full short circuit.

Current foldback operation is achieved as a result of two factors in the present invention. First, between points 61 and 63, $V_o$ is decreased primarily as a function of reduced switch conduction time. With further increases in load conductance, however, a danger arises that the switch conduction time required to maintain current below $I_{o\,max}$ will become shorter than the response time of the power switch and/or of the control circuitry. Accordingly, in order to achieve a duty cycle small enough to maintain $V_o$ (and thereby $I_o$) at a low value, the switching period $T_p$ is lengthened.

The foregoing function is achieved by a time base frequency shifter (or period extender) 65 (FIG. 2). It comes into operation when $V_o$ drops below a predetermined value, shown as point 63 in FIG. 3A, add operates on time base generator 28 to extend the period $t_{off}$ as shown in graph (d) of FIG. 3. In graph (d), $t_{min}$ represents a hypothetical minimum attainable switch response time at which it is required to extend $t_{off}$ in order to maintain control. Since, under short circuit conditions, the output current is limited only by the voltage drops across the diode, internal wiring and component resistances in the output circuit, the duty cycle is reduced by the current limiter operation to an extremely small value permitting the sum of the above voltage drops to equal the average value of voltage developed across the output transformer secondary.

Figure 4:
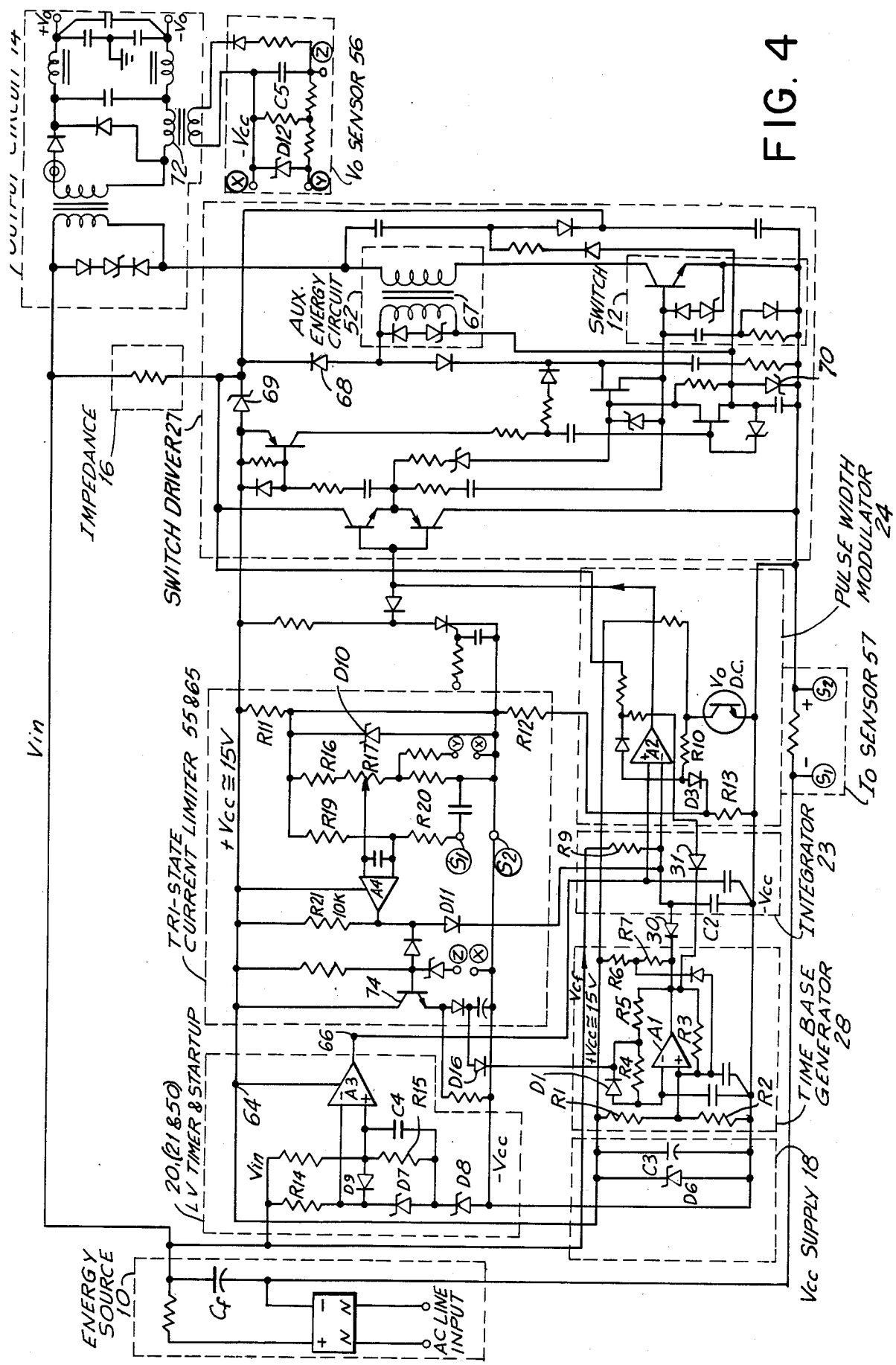
FIG. 4 is a detailed electrical schematic diagram of a switching power supply incorporating the invention depicted in the block diagram of FIG. 2.

Turning to FIG. 4, the electronic circuits corresponding to the elements depicted in FIG. 2 are outlined by the dashed lines. These lines are drawn primarily for ease of understanding the circuit diagram, and should not be taken in any rigid sense. It is important to note that a majority of the elements depicted in FIG. 4 can be incorporated in a single semiconductor chip providing all of the basic control functions. Such a semiconductor chip, for example, could provide inputs for connecting sensing voltages (e.g., $V_o$, $I_o$) to the chip, and also for connecting separate external components selected to achieve specific operating conditions, e.g., the operating frequency of the power supply.

DETAILS OF THE REGULATING CONTROL SYSTEM

1. Time Base Generator

Time base generator 28 is found at the lower left of FIG. 4. Its operative elements have been reproduced in FIG. 5. As noted above, generator 28 defines a stable time base reference consisting of a maximum switch conduction period $t_{max}$ at the selected switching frequency f, where $T_p = 1/f$. Time base generator 28 supplies the pulses 35 shown in FIG. 3, graph (a).

Figure 5:
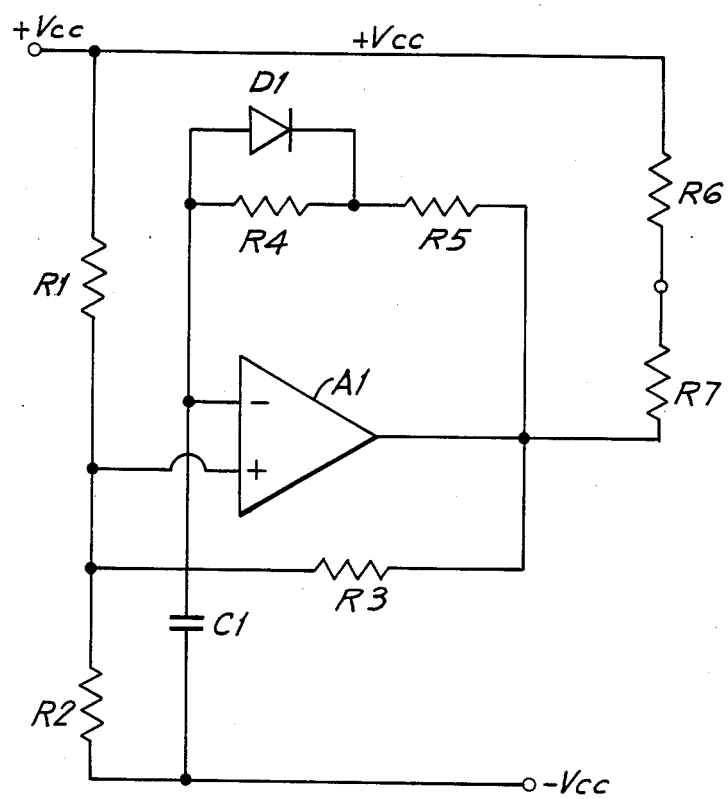
FIG. 5 is a circuit diagram of the time base generator portion of the circuit shown in FIG. 3.

Turning to FIG. 5, A1 is a differential comparator whose output is high when the signal at its positive input exceeds the signal at its negative input. At all other times the output of A1 is low. The output stage of comparator A1 comprises a transistor whose collector is connected to the output terminal. When the output is low, the transistor is in hard saturation, essentially coupling the output to minus $V_{cc}$. When the output is high, the transistor is essentially non-conducting and the output presents infinite impedance.

Time base generator 28 operates as follows: The control circuit voltage $V_{cc}$ is substantially constant at about 15 volts. The signal at the positive input to A1 is either 5 volts or 10 volts, depending on the state of comparator A1. When A1 is in saturation, R2 and R3 are connected in parallel. When the output of A1 is high, R3 together with R6 and R7, are connected in parallel with R1. Thus, when the output of comparator A1 is high, capacitor C1 charges through both resistors R4 and R5 to produce a positive-going ramp signal at A1's negative input. When the ramp signal reaches 10 volts (the magnitude of the signal at the positive input), the output of A1 goes into hard saturation, and capacitor C1 discharges through diode D1 and resistor R5 only.

The charge time for C1 during the positive-going ramp establishes the period $t_{max}$ shown in FIG. 2; the discharge time for C1 establishes the period $t_{off}$. The sum of $t_{max}$ and $t_{off}$ constitutes the switching period $T_p$ for the control circuit. The switching rate is set by the relative values of R4, R5 and C1. Typically, the switching rate is on the order of 35 KHz.

2. Pulse Width Modulator

Figure 6:
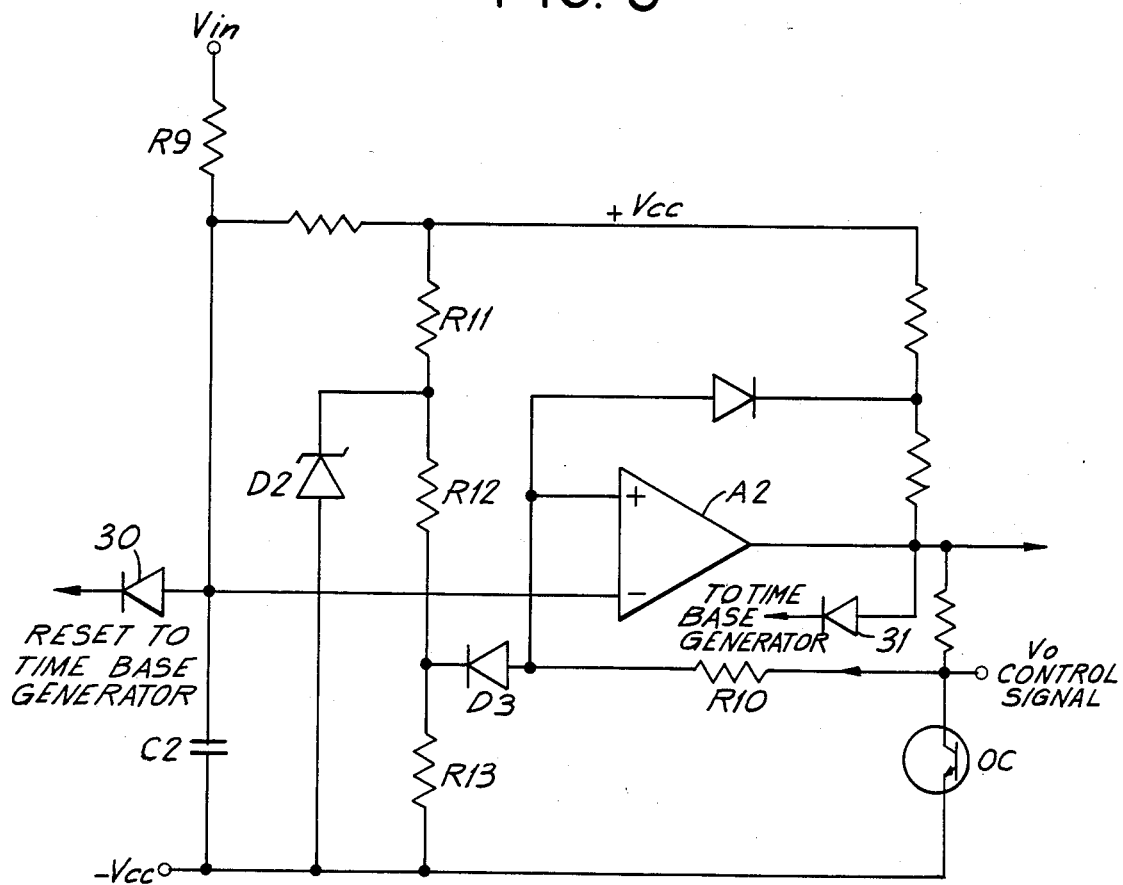
FIG. 6 is a circuit diagram of the linear feed-forward pulse width modulator portion of the circuit shown in FIG. 3.

Referring to FIG. 6, the modulator circuit illustrated provides a switch activation pulse whose duration is a function of the control loop error voltage and $V_{in}$.

For an a.c.-driven power supply, the voltage $V_{in}$ appears across the input rectifier filter capacitor (not shown) and is proportional to line voltage. As shown, $V_{in}$ is applied to resistor R9 of integrator 23. Current through R9 charges capacitor C2 at a rate which is a function of time and line voltage. The voltage at integrating capacitor C2 is applied to the negative input of comparator A2.

A control signal representing $V_o$, derived from an optical coupler OC, is applied to the positive input of comparator A2 through resistor R10. The magnitude of this signal is limited to a value established by the voltage divider network R11, R12 and R13 and zener diode D2. Diode D3 clamps the $V_o$ loop control signal at this maximum voltage.

It will be understood that the loop control signal varies inversely as a function of output voltage $V_o$. For example, should the output voltage $V_o$ rise incrementally, the incremental rise is sensed by the circuit driving the optical coupler OC, causing it to increase in conduction and thus lower the $V_o$ loop control signal. In that event, assuming a constant line voltage, the integrated signal applied to the negative input of comparator A2 will attain the value of the loop control signal earlier. Consequently, comparator A2 output will be in the high state for a shorter duration. Switch 12 will thus be activated for a shorter period of time.

The negative input of comparator A2 is coupled to time base generator 28 thoough diode 30. During the presence of each time base pulse 35, diode 30 is back-biased and has no effect. In the period $t_{off}$, however, diode 30 conducts to discharge C2, thus resetting the integrated signal to its initial starting value. At the same time, output of comparator A2 is clamped to $-V_{cc}$ through diode 31, which is also connected to the time base generator. Diode 31 thus precludes the appearance of a switch activation signal for the remainder of the time base period $T_p$. A new switch activation pulse will not appear at the output of comparator A2 until the occurrence of the next time base pulse.

3. Start-up and Low Voltage Timer Circuit

Figure 7:
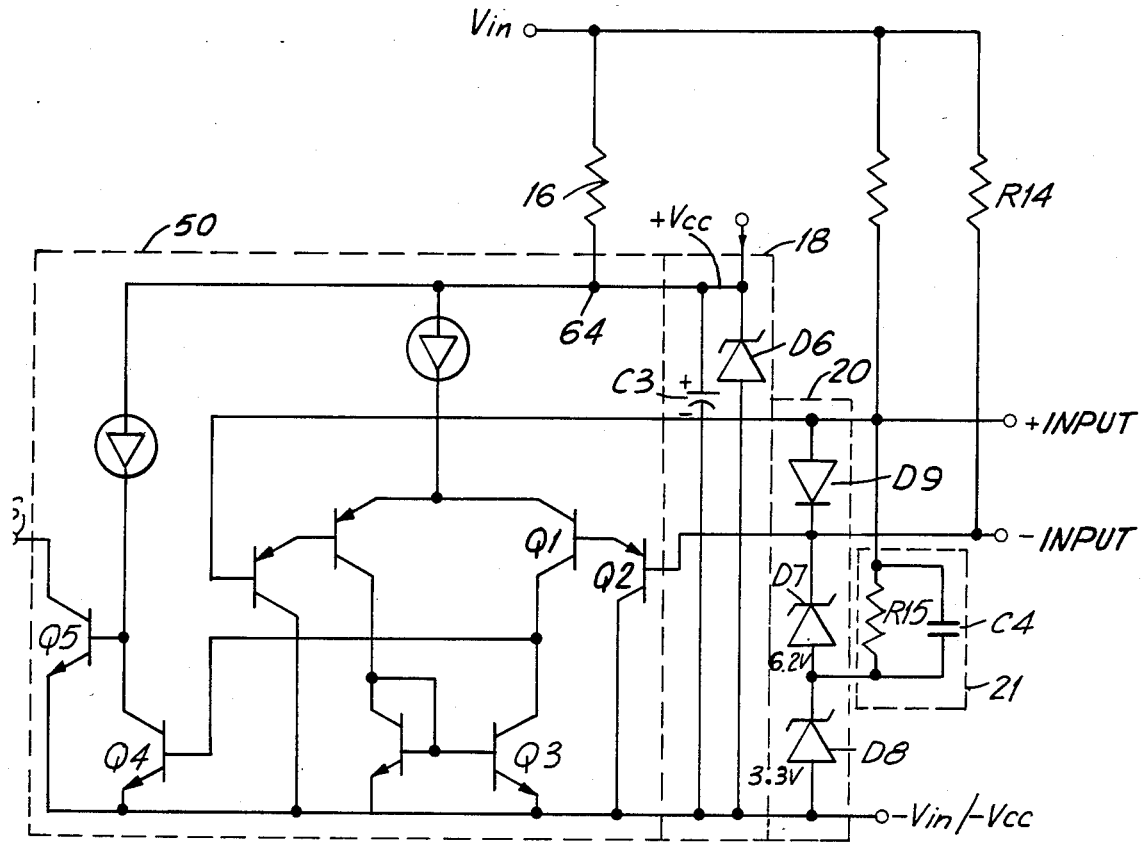
FIG. 7 is a circuit diagram showing the details of the low voltage timer and start up control cirucit means incorporated in the supply of FIG. 3.

FIG. 7 illlustsrates the circuit details of elements 16, 18, 20, 21 and 50 in FIG. 2. Those elements control operation of the power supply during start-up and under low voltage conditions.

As noted earlier, one objective of the invention is to reduce needless power dissipation in the control circuit. This is obtained in large measure by restricting the amount of current consumed by the control circuit itself. In the present invention, this restricted current actually may be less than is required for sustained operation of the control circuitry, but the circuit operates due to the infusion of additional electrical energy from an auxiliary energy circuit when the power switch is not conducting. During start-up, the current drawn by the control ciruuitry is minimized by restricting the duty cycle of switch conduction.

Referring to FIG. 7, when the power supply is first connected to the input source, $V_{in}$ gradually builds up from a low level. Input current is supplied via resistive impedance 16. This current gradually charges capacitor C3, constituting the energy storing means for the internal $V_{cc}$ power supply of the control circuit. Zener diode D6 establishes the 15 volt reference for the $+V_{cc}$ supply. $V_{cc}$ powers the comparator A3 of the pulse inhibit circuit 50 through its terminal 64.

Zener diodes D7 and D8 of voltage reference circuit 20 establish a reference of about 9.5 volts at the negative comparator input. However, the signal at the negative input is connected to $V_{in}$ through R14 and, until $V_{cc}$ reaches 9.5 volts, transistors Q1, Q2, Q3 and Q4 all are off, and output stage transistor Q5 is in full saturation. Output 66 is connected to the positive input of modulator comparator A2 (FIG. 4). Accordingly, the output of A2 is inhibited until $V_{cc}$ reaches at least 9.5 volts. When this occurs, output stage transistor Q5 of comparator A3 turns off, thus removing the clamp at the pulse width modulator. The first switch activation pulse then appears at the output of comparator A2.

During times of switch activation, drive current for switch 12 is supplied by the control circuit. Priming power is taken from the $V_{cc}$ capacitor C3. During start-up, however, depletion of energy from C3 causes $V_{cc}$ to drop below 9.5 volts, and output of comparator A3 once again goes into saturation to terminate the switch activation pulse. Since the $V_{cc}$ supply is power-limited, it cannot provide operating power to the control device. Additional power must be supplied from an auxiliary source. This extra power is derived from auxiliary energy circuit 52 (FIG. 4), as follows.

Referring to FIG. 4, auxiliary energy circuit 52 comprises a regenerative current transformer 67 whose primary winding is in series with the collectr of switch 12, and whose secondary is connected in a series circuit with the $V_{cc}$ capacitor C3. When switch 12 turns off, current energy stored in the secondary of transformer 67 is transferred via diodes 68 and 69 to capacitor C3, the current path being completed through $-V_{cc}$ and zener diode 70 (FIG. 4, lower right). The regenerative energy supplied from transformer 67 exceeds the energy taken by the circuitry during switch conduction, thus building the energy (and voltage) at C3 to a higher level for each succeeding cycle until, ultimately, $V_{cc}$ has attained its regulated value of 15 volts. In the interim, $t_{off}$ is extended such that the swttching frequency is effectively reduced during start-up operation. The repetition rate during start-up can be reduced to as low as 200 Hz, it being understood that this frequency gradually increases as the voltage across C3 of $V_{cc}$ supply 18 builds up. The auxiliary energy need not, but preferably does, emanate from a regenerative element such as transformer 67.

A second function achieved in comparator A3 is to inhibit the production of switch activation pulses to shut down the power supply when $V_{in}$ falls below a predetermined value for a given length of time. This function is achieved through timing circuit 21, which comprises resistor R15 and C4 (FIG. 7). As shown, this circuit is connected between zener diode D8 and the positive input of comparator A3. Diode D9, connected between the comparator A3 inputs, limits the maximum difference voltage to the forward diode drop, i.e., about one volt. Capacitor C4 is charged to the sum of the voltage drops across diodes D7 and D9.

If $V_{in}$ drops below a predetermined minimum value, tending to cause reversal of the differential input voltage polarity, at A3, timing capacitor C4 discharges through R15. Once the charge on capacitor C4 falls by one volt, the sense of the differential input signal reverses, and comparator output 66 thereby, goes into saturation. The production of switch activation pulses is consequently inhibited. The low-voltage time limit is determined by the time constant of C4 and R15, and by the forward voltage (1 volt) across diode D9. The power supply remains shut down for as long as the input voltage remains below the predetermined low voltage-limit.

4. Tri-State Current Limiter

Figure 8:
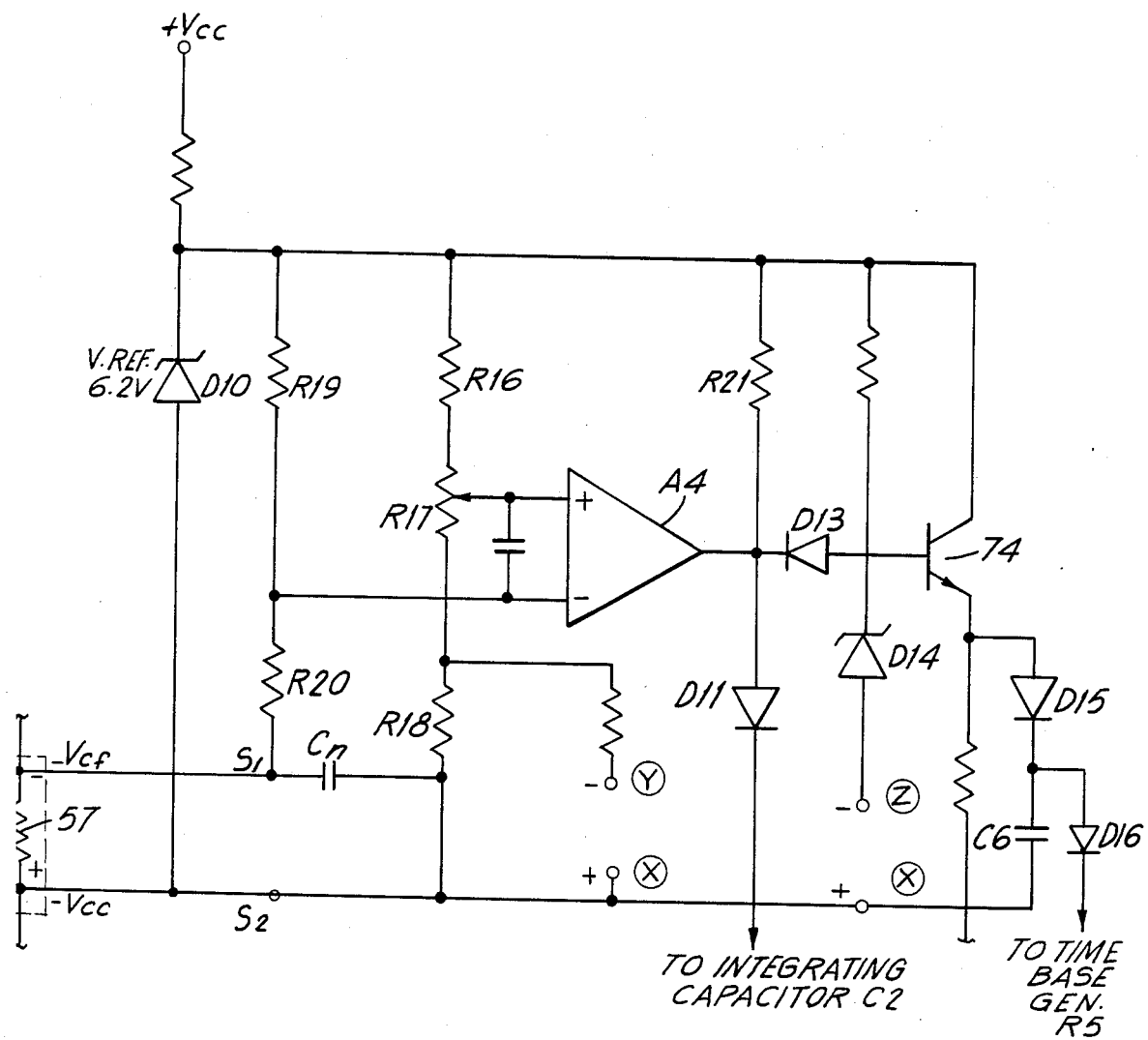
FIG. 8 is a circuit diagram of the elements in FIG. 3 forming the limiting means of the power supply.
Figure 8:
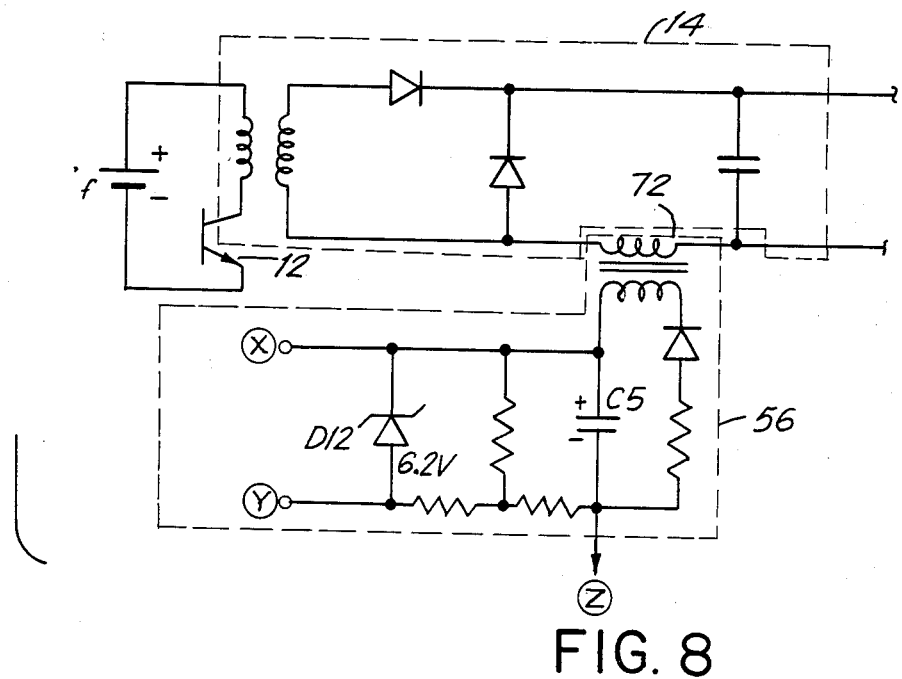

Referring to FIG. 8, in conjunction with FIG. 4, current limiting operation is attained, in general, first by overriding the loop control signal under excessive load conditions and, second, by extending the period $T_P$ and thereby reducing the switching frequency, under conditions of short circuit or near short circuit of the power supply output.

Two inputs are provided to the current limiter. Noise on the common $V_{cc}$ line is supplied in near equal value to both inputs to achieve effective noise immunity. As best seen in FIG. 8, a stable reference voltage estallished by zener diode D10 is impressed across voltage divider network R16, R17, and R18. The voltage at aduustable resistor R17 is applied to the positive input of comparator A4. This voltage sets the initiation point of current limiting. (See point 60 in FIG. 3A).

Current limiting is controlled by comparator A4, which is normally in saturation, so that its output is essentially coupled to $-V_{cc}$. As long as A4 is saturated, no current limiting takes place.

A voltage signal proportional to output current $I_o$ is developed across the sensing resistor 57 and applied in series with the voltage divider network R19 and R20. This signal, it should be noted, is in the form of a pulse whose amplitude tracks the current pules through switch 12. The voltage of the junction of R1 and R20 is connected to the negative input of comparator A4. Accordingly, the $I_o$ current limiting signal appears at this input to the comparator.

At the current limit point 60 (FIG. 3A), the differential signal across the inputs to comparator A4 reverses polarity and comparator A4 output, which is normally in saturation, opens. Current is then immediately supplied via resistor R21 and diode D11 to the integrator capacitor C2. The resistance of R21 is much smaller than to the resistance of integrating resistor R9. Integrating capacitor C2 therefore quickly charges to the control limit and the switch activation pulse terminates. The current limit operates in this mode throughout the constant current region shown in FIG. 3A.

As explained above, the current sample signal developed across the sampling resistor 57 is a pulse waveform, since nearly all of the output current flowing through this resistor occurs only during switch conduction. This current pulse is not a perfect square wave; it tends to slope upwardly from beginning to end. Because of this characteristic of the current pulse, the time at which the current limiter begins to take effect within each switch conduction period is dependent upon the magnitude of the switch current pulse.

When the output voltage $V_o$, in the current limiting mode, falls to a value between about 30%–50% of rated output voltage, current foldback begins. This is point 61 in FIG. 3A. To understand how current foldback operation is achieved, it is helpful to consider the $V_o$ sensor circuit 56. This circuit is also reproduced in FIG. 8.

The $V_o$ sensor picks up a signal proportional to output voltage from a voltage transformer 72 in the output circuit. During the period $t_{off}$, essentially the full output voltage is developed across the primary of transformer 72 and, consequently, the voltage across the secondary of the transformer 72 is representative of $V_o$. This voltage also appears across filter capacitor C5 (FIG. 8). A zener reference diode D12 is connected between sensor output terminals X and Y. The zener voltage may be, for example, 6.2 volts. As long as the voltage across C5 is sufficient to maintain the 6.2 volts reference value across diode D12, the $V_o$ sensor signal remains at the reference value.

This $V_o$ sensor signal is impressed across resistor R18 of the current limiter and, accordingly, sets a reference level (6.2 volts) at adjustable resistor R17. However, as $V_o$ reaches point 61 in FIG. 3A, zener diode D12 ceases to conduct and the sensor output signal across terminals X, Y will vary with $V_o$. Under these circumstances, less current is required to change the state of comparator A4, and current limiting will occur at increasingly lower output voltages. Stated another way, the switch activation pulses will become of increasingly shorter duration as load conductance increases in the current foldback region.

If load conductance continues to increase, the power supply must have the capacity for further reducing output voltage to prevent current runaway. However, a point is reached where the duration of switch activation can no longer be controlled, since the time period $t_{on}$ set by the control loop may be smaller than the electrical response time of the circuit. In other words, switch 12 can no longer be turned on and off within the small segment of time dictated by the control loop under near short-circuit condition. For this reason, the current limiter incorporates a third mode of operation, which may be regarded as a frequency shifting mode, wherein the period $t_{off}$ is extended so as to increase the period $T_p$. This, of course, shortens the duty cycle of switch operation and causes a further reduction in $V_o$.

Frequency shifting operation occurs when transistor 74 conducts. The base of transistor 74 is connected through diode D13 to the output of comparator A4. Normally diode D13 is reversed-biased owing to the normally conducting state of zener diode D14. Because diode D14 is in series with capacitor C5 of the voltage sensor, a point is reached (point 63 in FIG. 3A) where zener diode D14 stops conducting. Then, when transistor 74 conducts, capacitor C6 (FIG. 8) charges through diode D15. The charge across capacitor C6 in turn is coupled via diode D16 to the timing network of time base generator 28. During the discharge cycle of the time base timing circuit, capacitor C6 discharges through R5, along with capacitor C1, extending the capacitor discharge time and, consequently, lengthening the period $t_{off}$. Of course, the extension of $t_{off}$ effectively extends the switching period $T_p$ and reduces the duty cycle of the power transferred to the load under current overload conditions.

5. Switch Driver

As shown in FIG. 2, switch 12 is activated through switch driver 27. Basically, switch driver 27 is designed to cause rapid turn-on and positive turn-off of switch 12 in accordance with the switch activating signal at the output of pulee width modulator 24. Since the driver forms no part of the invention per se, it will not be discussed.

SUMMARY

From the foregoing, it is apparent that the invention provides complete control for single-ended regulated switching power supplies. It is configured to permit operation over a wide range of input and output conditions. It is capable of operating with large duty cycles to compensate for low input voltages and yet, during normal conditions, functions at moderate duty cycles which do not stimulate excessive dissipation. Importantly, it is configured to operate with minimal operational current. Indeed, the circuit is so designed that it is necessary only to provide sufficient current to operate the low-power electronic devices. Moreover, the start-up circuit is combined with a low-voltage timer so as to bring about power supply shut-down under line conditions that would otherwise call for large duty cycles of power transfer to the output circuit. Finally, the invention incorporates three-state current limiting to permit the power supply to operate under virtual short-circuit.

It should be understood that, although the invention has been described with reference to a preferred embodiment, there is no requirement that the invention be implemented in the precise manner indicated. The inventors have chosen to use specific techniques for regulating the duty cycle of the switch activation pulses, but several modifications are possible. For example, trailing edge pulse modulation is used and, accordingly, it is possible to terminate the switch activation pulse by applying the appropriate signals at a number of points in the circuit. Similarly, it is possible to achieve frequency shifting, or extension of the period $T_p$, by means other than precise circuits described above. As another example, the time base signal can be generated in a manner wholly different from that illustrated. Thus, many modifications and variations will readily occur to those skilled in the art and, accordingly, all such modifications and variations are intended to be included within the scope of the appended claims, unless the contrary is indicated.

We claim:

1. Regulating control means for a single-ended regulated switching power supply operable from an external energy source and of the type having an output circuit connectable to a load to be supplied and a controllable switch to provide output regulation of an electrical output parameter by controlling the duty cycle of the power transferred from the source to the output circuit, the regulating control means comprising:

means jointly responsive to the energy source input voltage and the output parameter to be regulated for generating a signal to activate the switch at a given normal repetition rate determined by a time period between initiation of successive periods of switch activation and for a duration determined by the source voltage and the output parameter so as to maintain said output parameter at a desired value; and a start-up circuit for temporarily reducing the duty cycle of the power transferred by the switch, thereby to limit start-up current, said start-up circuit being operative to extend said time peirod and thereby to reduce the normal repetition rate of said switch activation signal during start-up of the power supply.

2. The power supply regulating control means of claim 1, wherein:

said switch activating signal generating means comprises means for integrating a periodic signal representative of the source voltage, and means for comparing the periodic integrated signal with a signal representative of the output parameter, said comparing means providing a switch activating signal after start-up at said normal repetition rate when the magnitude of one of said compared signals is less than the other of said compared signals.

3. The power supply regulating control means of claim 2, further comprising:

means for resetting said integrated signal to a reference value prior to each occurrence of switch activation.

4. The power supply regulating control means of claim 2, wherein:

said start-up circuit is operative to substitute a reference signal for one of said compared signals so as to inhibit the production of a switch activating signal during predetermined start-up conditions.

5. The power supply regulating control means of claim 4, further comprising:

a timing circuit connected to said start-up circuit for producing said reference signal to cause inhibition of said switch activating signal when such source voltage is less than a predetermined value over a given period of time.

6. The power supply regulating control means of claims 1 or 2, further comprising:

means for limiting the maximum duration of said switch activation signal at said normal repetition rate to establish a maximum duty cycle of substantially in excess of 50%.

7. The power supply regulating control means of claim 6, wherein:

said maximum duty cycle of switch activation is at least about 70%.

8. The power supply regulating control means of claim 2, further comprising:

means for limiting the magnitude of one of said compared signals, thereby to inhibit the initiation of said switch activation signal during start-up conditions when the available source energy for said regulating control means is less than a value required for start-up.

9. The power supply regulating control means of claim 1, further comprising:

a timing circuit responsive to the source voltage for inhibiting the switch activation signal when such source voltage is less than a predetermined minimum value over a given time period.

10. The regulated switching power supply of claim 1, further comprising:

means for developing a current limiting signal in response to a load demand for an output current in excess of a maximum permissable value; and means for supplying said current limiting signal to said switch activating signal generating means so that the duration of the switch activating signal is inversely related to excessive output current demand.

11. Regulating control means for a single-ended regulated switching power supply operable from an external energy source providing a source voltage, the power supply being of the type having an output circuit connectable to a load to be supplied and a controllable switch to provide regulation of an electrical output parameter by controlling the duty cycle of the power transferred from the source to the output circuit, the regulating control means comprising:

a pulse width modulator jointly responsive to the source voltage and the output parameter to be regulated for generating switch activating pulses having a duty cycle related to variations in said source voltage and the output parameter so as to maintain said output parameter at a desired value, said switch activating pulses not exceeding a maximum pulse width;

an internal power supply circuit for said control means and including energy storage means supplied by current from the source at a restricted rate; and a start-up circuit for at least temporarily inhibiting switch activation to reduce the frequency of said switch activating pulses when the energy stored in the energy storage means is insufficient to maintain activation of the switch for a duration required to achieve the desired value of the output parameter, thereby to limit the source current utilized for the operation of the regulating control means during start-up.

12. The power supply regulating control means of claim 11, wherein said start-up circuit comprises:

means jointly responsive to the internal power supply voltage and a first reference voltage to inhibit switch activation when a fraction of said internal power supply voltage is less than said first reference voltage.

13. The power supply regulating control means of claim 11, further comprising:

a timing network for establishing a low source voltage timing signal having a magnitude, relative to a reference magnitude, which changes as a function of time when the source voltage is less than a minimum permissible level for sustained operation, said start-up circuit being operative to inhibit switch activation when said low source voltage timing signal magnitude attains said reference magnitude.

14. Regulating control means for a single-ended regulated switching power supply operable from an external energy source and of the type having an output circuit connectable to a load to be supplied and a controllable switch to provide regulation of an electrical output parameter by controlling the duty cycle of the power transferred from the source to the output circuit, the regulating control means comprising:

means jointly responsive to the source voltage and the output parameter to be regulated for generating a signal for activating the switch at a given normal repetition rate, the duration of each activation being variable in accordance with the source voltage and the output parameter so as to maintain said output parameter at the desired value during normal operation;

an internal power supply circuit for said regulation control means including means to limit the current drawn from the energy source, a capacitor for receiving said limited current and connected to supply energy to the components of the regulating control means, and voltage reference means for maintaining the voltage at said capacitor at a selected value;

energy storage means in circuit with the switch for storing a portion of the energy transferred through said switch during one portion of the repetition rate cycle and connected to supply said capacitor with supplemental energy during another portion of said cycle, thereby to charge said capacitor to a higher level upon successive periods of switch conduction; and means for inhibiting switch activation to thereby extend the off-time period between successive activations of said switch when the energy stored in said power supply circuit is less than a prescribed minimum value.

15. The power supply regulating control means of claim 14, wherein:

said energy storage means comprises a regenerative transformer circuit.

16. Regulating control means for a single-ended regulated switching power supply operable from an external energy source and of the type having an output circuit connectable to a load to be supplied, and a controllable switch to provide regulation of an electrical output parameter by controlling the duty cycle of the power transferred from the source to the output circuit, the regulating control means comprising:

a time base signal generator defining a desired period of conduction for said switch at a specified switching rate, said rate establishing a normal time base period $T_p$ constituted of a maximum switch conduction period $t_{max}$ and a switch non-conduction period $t_{off}$;

switch activation signal means jointly responsive to the source voltage and the electrical output parameter to be regulated for generating a switch activation pulse for each period $T_p$ having a duration which is variable in accordance with the source voltage and the output parameter so as to maintain said output parameter at the desired value, said switch activation signal means including a first circuit for developing a first signal varying generally linearly with time as a function of said source voltage and time-referenced to said period $T_p$, a second circuit for developing a second signal whose magnitude is representative of the output parameter, and means jointly responsive to said first and second signals and providing said switch activation signal when the magnitude of one of said first and second signals is less than the magnitude of the other of said signals, the range of variaton of said signals being such as to restrict the duration of said switch activation signal to a value less than said maximum period $t_{max}$ under normal operating conditions; and means for restricting the maximum duration of said switch activation signal to said maximum period $t_{max}$ of said time base signal.

17. The power supply regulating control means of claim 16, wherein:

the maximum duty cycle $t_{max}/T_p$ of switch activation is not less than about 70%.

18. The power supply regulating control means for claim 16, wherein:

said means for restricting said switch activation signal to a duration not exceeding $t_{max}$ within any period $T_p$ is operative when the source voltage is insufficient to maintain the regulated output parameter at said desired value.

19. The power supply regulating control means of claim 16 wherein:

said first circuit includes means for resetting the magnitude of said first signal to a prescribed value following each switch conduction period.

20. The power supply regulating control means of claim 16, further comprising:

means responsive to output current increments in excess of a prescribed maximum value under excess load conditions for developing a current limiting signal; and means responsive to said current limiting signal for reducing the duty cycle of switch activation to thereby reduce the output voltage by an amount sufficient to substantially limit the output current to said prescribed maximum value.

21. The power supply regulating control means of claim 20, wherein:

said output voltage is reduced under excessive load conditions by such amount as to maintain said output current substantially constant over a prescribed range of output voltages.

22. The power supply regulating control means of claim 20, wherein:

said output voltage outside said range is reduced by such amount as to achieve current foldback, thereby to reduce said output current with increasing load conductance.

23. The power supply regulating control means of claim 22, wherein:

said current limiting means is operative to extend the time period $t_{off}$, thereby to reduce the switching rate, with a consequent reduction in output voltage under excessive increasing load conductance.

24. The power supply regulating control means of claim 23, wherein said current limiting means comprises:

an output-voltage sensing circuit providing a voltage reference signal for output voltages in excess of a given control level;

a current sensing circuit for developing a signal that is a function of output current; and means jointly responsive to said voltage reference signal and current function signals for generating said current limiting signal when the magnitudes of said signals have a predetermined relationship.

25. The power supply regulating control means of claim 24, wherein:

said reference signal varies in accordance with output voltage when said output voltage is less than said given control level, said current limiting signal being generated at relatively lower output current values when said output voltage is less than said given control level.

26. The power supply regulating control means of claim 24, wherein:

said reference signal varies in accordance with output voltages less than said given control level; the current limiting means further comprising means responsive to said variable reference signal for extending the period $T_p$ in the current limiting mode of operation.

27. The power supply regulating control means of claim 20, wherein:

said current limiting means controls the duty cycle of switch activation so as to reduce output voltage under excessive load conditions to achieve (a) substantially constant current operation of said output power at a prescribed maximum permissable current value over a given range of output voltages and (b) output current foldback operation for increasing load conditions resulting in output voltages less than said range.

28. The power supply regulating control means of claim 27, wherein said circuit limiting means includes:
   means for reducing the duration of said switch activation signal over said given range of output voltages as a function of increasing load conductance; and
   a frequency shifting circuit responsive to output voltages below a given value so as to extend the time base period $T_p$ with further increases in load conductance, thereby to reduce the switching rate at which power transferred to the output circuit.

29. The power supply regulating control means of claim 16, further comprising:
   means for limiting the current supplied from the energy source to said regulating control means;
   an internal voltage supply for said regulating control means; and
   means for extending said time base period $T_p$ when the energy stored in said internal voltage supply is below a minimum value required for sustained operation, thereby to limit the power consumed by said regulating control means.

30. Regulating control means for a single-ended regulated switching power supply operable from an external energy source having a source voltage, said regulating control means being of the type having an output circuit connectable to a load to be supplied, and a controllable switch to provide regulation of an output power parameter by controlling the duty cycle of the power transferred from the source to the output circuit, regulating control means comprising:
   means jointly responsive to the source voltage and the power output parameter to be regulated for generating a switch activation signal having a normally fixed pulse frequency and a pulse duration variable in accordance with the source voltage and the output power parameter so as to maintain said output power parameter at a desired value;
   current limiting means responsive to incremental output current in excess of a prescribed maximum value under excess load conditions for developing a current limiting signal; and
   means coupling said current limiting signal to said switch activation signal generating means so as to reduce the duty cycle of switch activation at said fixed pulse frequency, said current limiting means including
   an output-voltage sensing circuit providing a voltage reference signal variable in accordance with output voltages less than a given control level,
   a current sensing circuit for developing a signal that is a function of output current; and
   means responsive to said voltage reference and current function signals for generating said current limiting signal when the magnitudes of said signals have a predetermined relationship,
   said current limiting means being operative to reduce the output voltage and thereby maintain output current at a constant maximum value for output voltages exceeding said control level,
   said current limiting signal being generated at relatively lower output current values when said output voltage is less than said given control level so as to reduce the regulated output current to a value less than said maximum value.

31. The power supply regulating control means of claim 30 further comprising:
   means responsive to said variable reference signal for extending the duty cycle period, and thereby reduce the pulse frequency of said switch activation signal, in the current limiting mode of operation when said output voltage falls to a value smaller than said control level.

32. The power supply regulating control means of claim 30, wherein:
   said current limiting means controls the duty cycle of switch activation so as to reduce output voltage under excessive load conditions to achieve (a) substantially constant current operation of said output power at a prescribed maximum permissible current value over a given range of output voltages and (b) output current foldback operation for increasing load conditions resulting in output voltages less than said range.

* * * * *